UNITED STATES PATENT OFFICE.

HUBERT WAGNER, OF MUNICH-SCHWABING, GERMANY, ASSIGNOR TO CHARLOTTEN-BURGER FARBWERKE AKTIEN GESELLSCHAFT, OF CHARLOTTENBURG, GERMANY, A CORPORATION OF GERMANY.

LITHOGRAPHIC STONE.

1,029,835.       Specification of Letters Patent.     Patented June 18, 1912.

No Drawing. Continuation of application Serial No. 409,596, filed January 6, 1908. This application filed February 21, 1911. Serial No. 610,062.

*To all whom it may concern:*

Be it known that I, HUBERT WAGNER, a subject of the Emperor of Germany, and a resident of Munich-Schwabing, in the Kingdom of Bavaria, Empire of Germany, have invented a certain new and useful Improvement in Lithographic Stones, of which the following is a specification.

This invention relates to the art of lithography and its object is to produce a composite lithographic stone or roller of such size as to be of practical use, from small lithographic stones or pieces thereof by cementing the latter together, the cementing material used being such that in the completed composite stone it has characteristics similar to those of the stone itself.

It is well known to those familiar with the art of lithography that natural lithographic stones are in general too small in size to be of practical utility, while the exceptional individual stones, which are of practical size, are so costly as to make commercial use thereof prohibitive. It has therefore become the custom for workers in this art to unite small stones together so as to form a composite stone of adequate commercial size. Cements have been used to bind these small stones together, but many of the cements used heretofore have been found objectionable, because of the nature of the materials from which they are made or the methods used in the cementing process, so that they are not suitable for lithographing, especially when black or dark inks or colors are employed. The cement joints in some places fail to take up the colors and therefore do not print while in other places they do take up the colors and print, thus causing defects and blemishes in the finished lithograph. They are open to other objections also, such as that frequently they are affected in etching differently from the stone itself, or they are not of sufficient strength to firmly bind the lithographic stone fragments together or they are of a texture or grain different from that of the stones themselves, thus obviously causing imperfections in the lithographs for the printing of which they are utilized.

An important object of the present invention is to overcome these objections by producing a composite stone, in the form, for example, of a plate or roller, in which the cementing material has qualities and characteristics similar to those belonging to the lithographic stones cemented by said material. In accomplishing this result I use a cementing material composed of Sorel cement, powdered lithographic stone and comminuted metal. I have found that a cement is suitable which is composed of from forty to ninety parts of burnt magnesia, twenty to sixty-five parts of pulverized Solenhof stone, fifteen to forty parts of twenty-five per cent. magnesium chlorid and three to thirty parts of comminuted metal, such as iron.

In producing the product of my invention, the stones are first well worked and provided with quite smooth surfaces where they are to be cemented. They are then placed in a dry, warm chamber at a temperature of about thirty degrees centigrade and are completely dried by being completely warmed through. The edges are then smeared with the cement and the stones are rubbed against one another until the cement is suddenly bound directly with the surfaces of the stones after the air between them has been expelled. The cement is then allowed to dry completely, and the composite stone is ready for printing.

When lithographic stones are joined by the cement herein described and in the manner set forth, a composite lithographic stone or plate is obtained which is of suitable size and has suitable qualities for successful commercial use. This composite stone is equally as useful as a natural stone of commercial size and gives similar results in use. The cement forming the joints between the stones takes up ink and colors and is otherwise suitable for printing like the stone itself; it is not rougher nor smoother than the stone; it etches just as quickly and as evenly as the stone so that defects in the finished lithograph are not attributable to unequal etching at the joints; it holds the ink and colors similarly to the stone so that the lithograph is printed evenly and equally throughout its surface as if there were no joints. This perfection is possible because of the particular composition of the cement.

The metallic constituent thereof may be powdered more or less coarse or fine so as to make the grain or granulation of the surface of the cement the same as that of the surface of the stone. This metal serves not only to make the cement bind more effectively but also to produce a proper etching, the metal being of course affected by the etching acids. I have thus produced a stone composed of a plurality of stones cemented together by a cement which may be varied as to the sizes of its granulations to correspond with the sizes of the granulations of the stones which are being united, which has the same appearance, qualities and characteristics as said stones and which in the lithographing art is affected and acted upon and gives results similarly as said stones, so that the composite stone surface answers the many requirements of every printing process.

I claim:

1. A lithographic plate or roller comprising a plurality of lithographic stones united together by a cementing material comprising Sorel cement, powdered lithographic stone, and comminuted metal.

2. A lithographic plate or roller comprising a plurality of lithographic stones united together by a cementing material comprising burnt magnesite, magnesium chlorid, powdered lithographic stone and comminuted iron.

3. A lithographic plate or roller comprising a plurality of lithographic stones united together by a mixture of cement, powdered lithographic stone and comminuted metal.

4. A lithographic plate or roller comprising a plurality of lithographic stones united together by a mixture of powdered lithographic stone, comminuted metal, and a binder.

In testimony whereof I have hereunto set my hand in the presence of two subscribing witnesses.

HUBERT WAGNER.

Witnesses:
  MATHILDE K. HELD,
  A. VERETO COTTER.